(12) United States Patent
Van Boekel

(10) Patent No.: US 6,252,168 B1
(45) Date of Patent: Jun. 26, 2001

(54) MODULAR CABLE GUIDE SYSTEM

(75) Inventor: Franciscus Antonius Josef Van Boekel, Dordrecht (NL)

(73) Assignee: Dynisco HotRunners B.V., 's-Gravendeel (NL)

( * ) Notice: Subject to any disclaimer, the term of this patent is extended or adjusted under 35 U.S.C. 154(b) by 0 days.

(21) Appl. No.: 09/238,427

(22) Filed: Jan. 28, 1999

(30) Foreign Application Priority Data

Jan. 28, 1998 (EP) .................................................. 98200249

(51) Int. Cl.⁷ ....................................................... H01B 7/06
(52) U.S. Cl. ........................ 174/69; 174/70 C; 174/70 R; 174/99 R; 254/403
(58) Field of Search .................................... 174/69, 70 R, 174/70 C, 97, 98, 99 R, 68.1; 138/106, 177; 254/403

(56) References Cited

U.S. PATENT DOCUMENTS

| | | | |
|---|---|---|---|
| 4,866,215 | * | 9/1989 | Muller et al. ........................... 174/50 |
| 5,401,905 | * | 3/1995 | Lesser et al. ....................... 174/99 R |
| 5,792,993 | * | 8/1998 | Rinderer ................................ 174/101 |

FOREIGN PATENT DOCUMENTS

| | | |
|---|---|---|
| 0 468 485 | 1/1992 | (EP) . |
| 2 250 564 | 6/1992 | (GB) . |

* cited by examiner

Primary Examiner—Dean A. Reichard
Assistant Examiner—W. David Walkenhorst
(74) Attorney, Agent, or Firm—Young & Thompson

(57) ABSTRACT

The invention relates to a modular cable guide system for use in an injection moulding apparatus including

Figure 3:
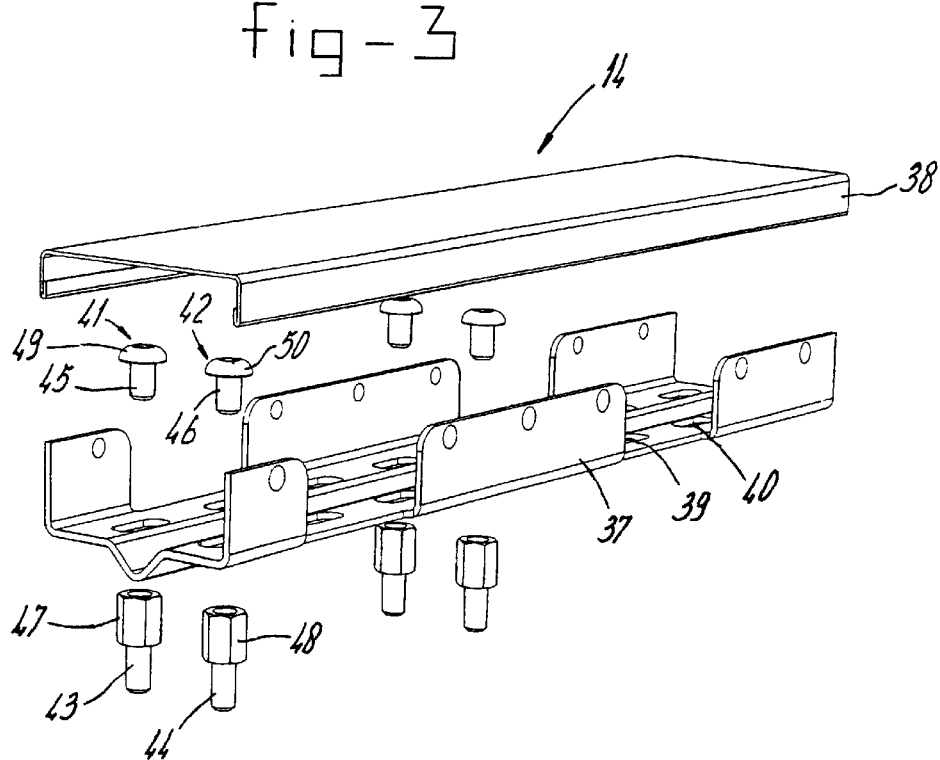

- at least one first cable guide conduit,
- at least one connector having a sleeve for fitting around a first end of the first cable guide conduit, clamping means for tightening the sleeve around the first cable guide conduit for forming a clamping connection with the conduit and a coupling member for connecting the connector to a machine part or to another cable guide conduit, and
- a second cable guide conduit having a number of regularly spaced connecting holes for receiving coupling elements for connecting the second guide conduit to the machine part.

The system according to the invention can be easily installed and can be made to the right size and placed into the right configurations upon installation.

10 Claims, 3 Drawing Sheets

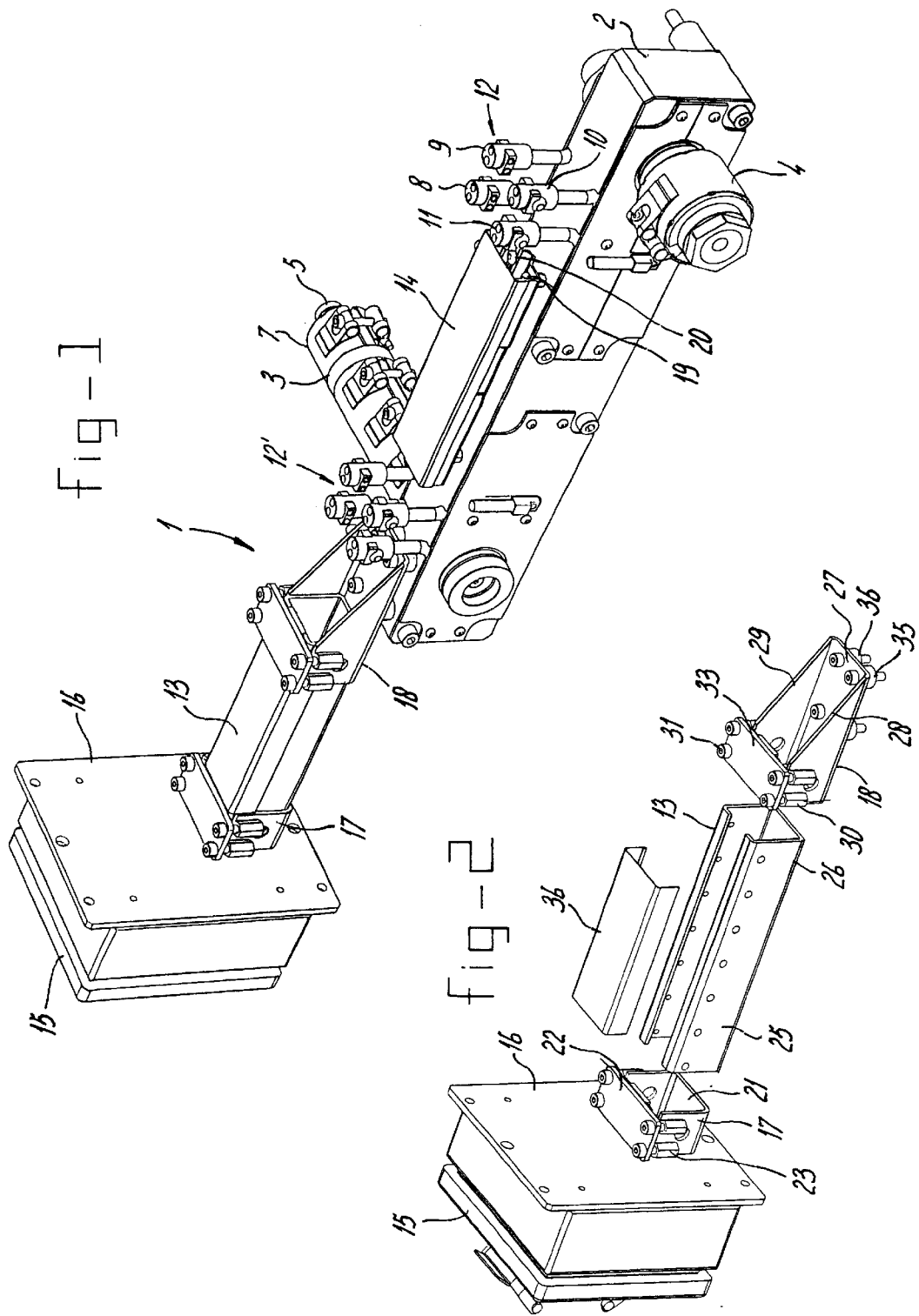

MODULAR CABLE GUIDE SYSTEM

The invention relates to a modular cable guide system for use in an injection moulding apparatus.

In injection moulding apparatus, the molten thermoplastic material is supplied to a moulding cavity via a system of conduits. These conduits are built into a mould which is maintained at a relatively low temperature to allow the molten thermoplastic material to cool and solidify. Systems wherein the conduits are heated, so-called "hot runner systems" are extensively used. The hot runner system comprises a central injection opening for injecting the plastic material into a manifold. A number of nozzles is connected to the manifold for injecting the molten thermoplastic material into the mould cavity. For maintaining the hot runner system at a high temperature (such as for instance 250° C.), electrical heating elements and thermocouples for measuring the temperature are distributed along the manifold. These heating elements and thermocouples comprise a large number of connecting wires which leave the manifold and which have to be guided to connector boxes outside the manifold area.

In general the central injection area, the manifolds and each nozzle comprises one or more heating elements and thermocouples. It is presently known to guide the connecting wires of all these elements via a single central channel to a connector- and/or control box. Manifold systems comprising four nozzles can comprise twelve controlled heating zones which include per zone a ground wire, two supply wires and two thermocouple wires, which amounts to a number of 60 connecting wires in total. Larger systems however are also common.

In order to avoid an irregular pattern of wires on the manifold system, to protect the connecting wires from mechanical damage and to isolate the wires from heat, use is made of cable guides. These cable guides are tubes through which the connecting wires are guided to the connector box outside of the manifold system. These cable guides have to be taylor made for each system and are each time designed according to specific demands as hot runner systems are client specific. The cable guides are separately drawn and constructed. This is a complex process which is relatively time-consuming and which has to be carried out each time in detail when designing a different injection moulding apparatus.

It is therefore an object of the present invention to provide a cable guide system which can be easily applied to different injection moulding configurations with a minimum of predesign, which is reliable, which is simple and which can be easily installed.

Thereto the cable guide system according to the present invention is characterised in that it comprises at least one first cable guide conduit, at least one connector having a sleeve for fitting around a first end of the guide conduit, clamping means for tightening the sleeve around the first conduit for forming a clamping connection with the conduit and a coupling member for connecting the connector to a machine part or to another cable guide conduit, and a second cable guide conduit having a number of regularly spaced connecting holes for receiving coupling elements for connecting the second guide conduit to the machine part.

The first cable guide conduit can bridge the space between the manifold and the connector box. As the ends of the first cable guide conduit fit into the sleeve of the connector, no separate connecting elements are present on the cable guide conduit itself so that it can be made to the right size by simply cutting off a part of the guide conduit from for instance a continuous stock of cable guide conduit. After having been cut or sawn to the right size, both ends of the cable guide conduit are clamped into a respective connector sleeve, one of which may be connected to for instance the connector- or control box, the other being connected to a machine part such as a manifold. From the first cable guide conduit, the wires are fed into the second guide conduit which is attached onto the machine part and which may bridge the space from the edge of manifold to the injection nozzles. As the second guide conduit comprises regularly spaced connecting holes, it can again be made to the right size by cutting off a part, for instance from a stock guide conduit of longer length. The pattern of holes corresponds with the pattern of threaded connecting bores on the machine part, such that any cut-off length of second cable conduit can be attached to the machine parts in a position corresponding with the pattern of holes thereon.

The modular cable guide system according to the present invention can be very easily installed because the cable guide conduits can be cut to the right size on site during installation. As no coupling elements are comprised on the first cable guide conduit, it can be cut at any place along its length and be clampingly engaged with the connectors. The same freedom in length dimensions is obtained for the second guide conduit by the regularly spaced connecting holes therein. Both cable guide conduits may comprise a tubular shape, or can comprise a separate lid which may be clipped on each cable guide conduit. The connectors may comprise coupling members located on a face parallel to the cable guide conduits for attaching to a side surface of the machine part or may comprise coupling members on a surface transverse to the first cable guide conduit for connecting to an end face of the machine part or manifold.

In a preferred embodiment, the connector comprises a first segment comprising the sleeve, a plate extending from the sleeve and comprising one of either two pins or two slots located on a circular track and a second segment comprising a plate extending parallel to the plate of the first segment and comprising the other of the two pins or the two slots and a coupling member or a sleeve for connecting the second segment to a machine part or to further guide conduit, the pins projecting through the slots such that the segments can be displaced with respect to one another, the pins further comprising locking means for fixing the relative positions of the segments. By the above construction, the two connector segments can rotate with respect to one another wherein the pins are guided along the circular slots. When in the right angular position, the locking means, which may comprise nuts around the threaded ends of the pins, may be tightened for fixing the connector segments relative to one another in this way the cable guide conduits may be interconnected at a large number of angular positions.

Each connector sleeve may comprise two upstanding oppositely located walls and a clamping plate bridging these walls. The clamping plate is connected to the walls by means of bolts. In this way a very secure connection to the end of each cable guide conduit is obtained, The second cable guide conduit may be connected to the machine part by coupling members comprising a first part having a screw thread and a gripping head for being threaded into the machine part and comprising in the gripping head an internal screw thread for receiving a second coupling element part having an external screw thread and a clamping head. Firstly the first parts are put into place in threaded bores on the machine part in a pattern corresponding to the holes on the second guide conduit. Thereafter the second guide conduit is placed onto the first members and is fixed thereafter by inserting the second coupling member parts into the first parts.

Figure 4:
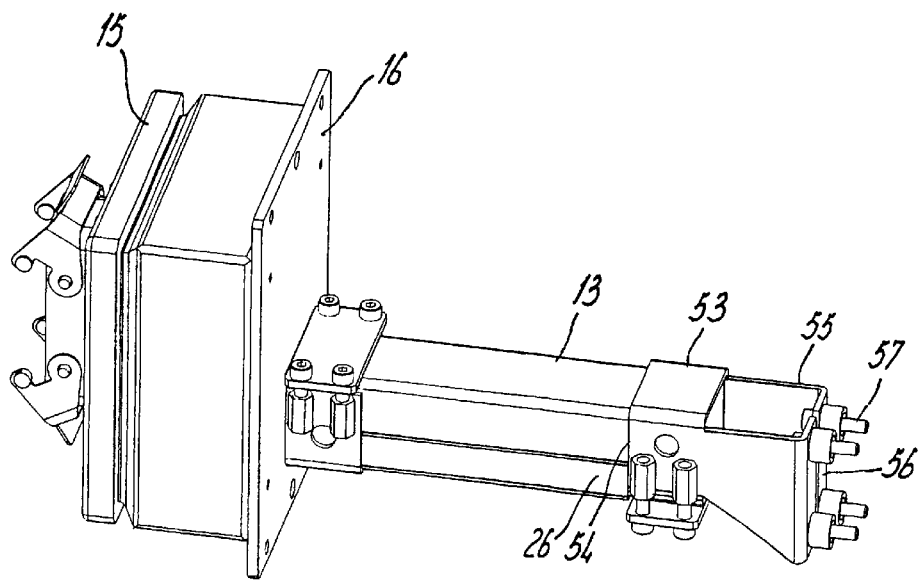
Figure 5:
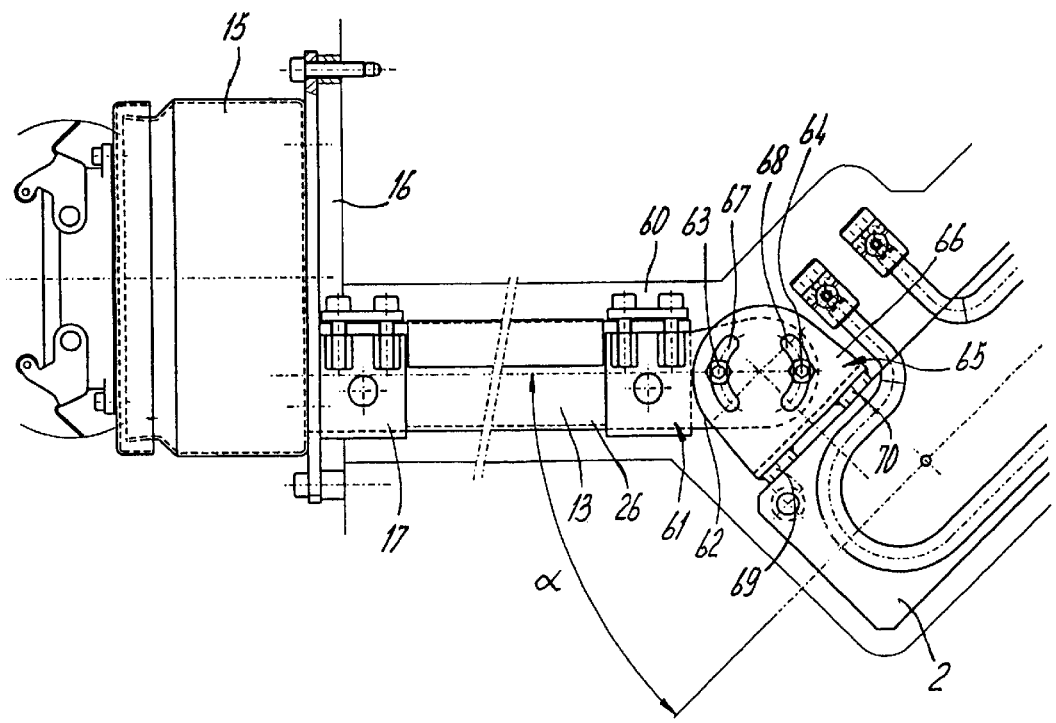
Figure 6:
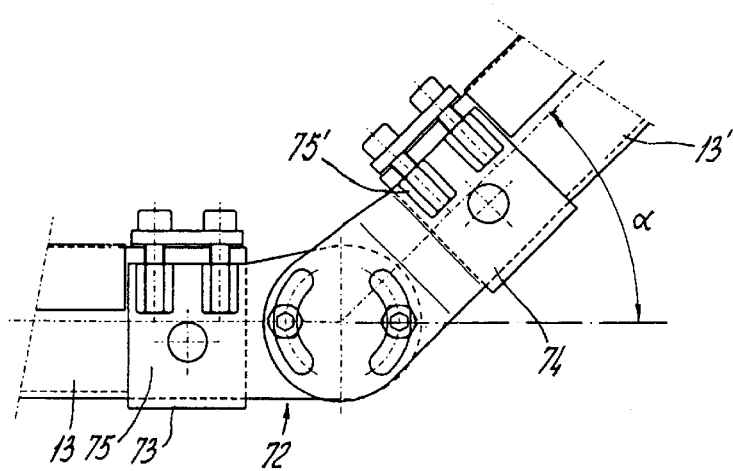

An exemplary embodiment of a modular cable guide system according to the present invention will be described in detail herebelow with reference to the accompanying drawings. In the drawings:

FIG. 1 hows a perspective view of a modular cable guide system according to the present invention, FIG. 2 shows a partly exploded view of a connector box, the first cable guide conduit and two connectors according to the present invention, FIG. 3 shows a perspective view of a second cable guide conduit according to the present invention, FIG. 4 shows a modular cable guide system comprising a connector with its coupling members placed in a plane transverse to the cable guide conduit, FIG. 5 shows a connector having two segments allowing angular adjustment of the cable guide conduits with respect to a machine part, and FIG. 6 shows a connector having two segments allowing angular adjustment of two interconnected cable guide conduits.

FIG. 1 shows a cable guide system 1 which is connected to a manifold 2 of a hot runner injection moulding device. The manifold 2 comprises an injection moulding nozzle 3 and a central nozzle 4 which receives the molten thermoplastic material from an extruder. The nozzle 3 is with its lower end 5 connected to a mould cavity, which is not shown in FIG. 1. Around each nozzle 3,4 an electrical heating element 7 is placed in the form of a clamping bush. For each heating element 7 two supply wires 8,9, a ground wire 10 and a thermocouple wire 11 exit from the manifold 2. Furthermore, there may be heating wires embedded in the manifold material for maintaining the manifold temperature around the supply ducts of the molten thermoplastic material at the desired level. These heating wires are not shown in this figure. The first group of electrical wires 12 is lead through a second cable guide conduit 14 to a first cable guide conduit 13, together with a second group of electrical wires 12' and from there to a wire receiving box 15, which may be a connector- or control unit comprising for instance an electrical power supply, a microprocessor for reading out the thermocouple signals and for controlling the power supply, etc, As can be seen from FIG. 1, the first cable guide conduit 13 is on one side connected to a connector plate 16 of the wire receiving box 15 via a first connector 17. The second end of the cable guide conduit 13 is connected to the manifold 2 via second connector 18. The second cable guide conduit 14 is connected to the manifold 2 via coupling elements 19,20 which are screwed into the manifold 2 and which project through holes in the bottom of the cable guide conduit 14, which holes are spaced at regular intervals along the bottom of the cable guide conduit 14.

As can be seen in FIG. 2, the first connector 17 on the connector plate 16 comprises a U-shaped part 21 and a clamping plate 22 connected to the U-shaped part 21 via bolts 23. The first end 25 of the cable guide conduit 13 clampingly fits in the sleeve which is formed by the U-shaped part 21 and the clamping plate 22. By tightening the bolts 23, the cable guide conduit 13 is securely and accurately affixed to the connector plate 16. The second connector 18 comprises a bottom plate 27 and two oppositely located upstanding side walls 28,29. Again, threaded bushes 30 are connected to the side walls 28,29 for receiving bolts 31 for connecting the clamping plate 33 to the side walls 28,29. The second end 26 of the cable guide conduit 13 can be clapingly engaged in the sleeve formed by the bottom plate 27, the side walls 28,29 and the clamping plate 33. The bottom plate 27 comprises coupling elements 35,36 for attaching to the manifold 2.

Although the first cable guide conduit 13 can be formed of a single piece of tubular material, it is preferred that the cable guide conduit 13 comprises a "snap on" lid 36 allowing access to the cables, also when the cable guide conduit 13 is mounted in place.

FIG. 3 shows the second cable guide conduit 14 comprising a lower part 37 and a lid 38. The lower part 37 is provided with regularly spaced connecting holes 39,40. The second cable guide conduit 14 is connected to the manifold by means of coupling elements 41,42 each comprising a first part 43,44 and a second part 45,46. The first parts 43,44 each comprise a threaded end and a gripping head 47,48. The first parts can be mounted in positions on the manifold 2 corresponding to the pitch of the regularly spaced holes 39,40 in the lower part 37 of the cable guide conduit 14. The gripping heads 47,48 are hollow and comprise an internal thread for receiving the threaded shafts of the second parts 45,46. The clamping heads 49,50 of the second part 45,46 affix the lower part 47 of the cable guide conduit 14 against the first parts 43,44 of the coupling elements 41,42.

FIG. 4 shows an embodiment wherein a connector 53 comprises a sleeve 54 around the second end 26 of the first cable guide conduit 13. The coupling member 55 of the connector 53 comprises a plate 56, transverse to the length direction of the cable guide conduit 13. Coupling elements 57 are located in the transverse plate 56 such that the connector 53 can be fixed to an end face of a machine part such as the manifold 2 shown in FIG. 1.

FIG. 5 shows an embodiment of a connector wherein the second end 26 of the cable guide conduit 13 is connected to a first segment 61 of the connector 60. The first segment 61 comprises a first plate 62 having two pins 63,64 projecting perpendicularly from the plate 62. A second segment 65 of the connector 60 comprises a plate 66 having two slots 67,68 located on a circular track. The second segment 65 is connected via coupling elements 69,70 to the manifold 2. By rotating the second segment 65 with respect to the first segment 61, the angle α between the cable guide conduit 13 and the manifold 2 can be varied between 0 degrees and 90 degrees. At the end of the pins 63,64, screws are provided for tightening the plate 66 against the plate 62 and for fixing the relative angular positions of the cable guide conduit 13 and the manifold 2.

Finally, FIG. 6 shows a connector 72 having two similarly shaped segments 73,74. In this case both segments 73,74 comprise a sleeve 75,75' in which end parts of a first and a second cable guide conduit 13, 13' are received respectively. By means of the two sections 73,74 the relative angle a between the cable guide conduits 13 and 13' can be varied.

What is claimed is:

1. A modular cable guide system (1) for use in injection moulding apparatus comprising:
   at least one first cable guide conduit (13),
   at least one connector (17, 18, 53, 60, 72) having a sleeve (54, 75) for slidably fitting around a first end of the first cable guide conduit (13), clamping means (22, 23, 30, 31, 33) for tightening the sleeve around the first cable guide conduit (13) for forming a clamping connection with the cable guide conduit and a coupling member (27, 35, 36; 55; 75') for connecting the connector to a machine part (2) or to a second cable guide conduit (13'), a first segment (61) comprising the sleeve, a first plate (62) extending from the sleeve, and comprising either two pins (63, 64) or two slots (67, 68) located on a circular track and a second segment (65) comprising a plate (66) extending parallel to the first plate (62) of the first segment (61) and comprising the other of the two pins (63, 64) or the two slots (67, 68) and a coupling member or a sleeve for connecting the second segment (65) to a machine part (2) or to the second cable guide conduit (13'), the pins (63, 64) projecting through the slots (67, 68) such that the segments (61, 65) can be displaced with respect to one another, at least one of the plates (62, 66) and pins (63, 64) comprising locking means, for fixing the relative positions of the segments (61, 65).

2. A cable guide system (1) according to claim 1, characterized in that, the cable guide conduits (13, 14) and the sleeve (54, 75) are of rectangular cross-sectional shape.

3. A cable guide system (1) according to claim 2, characterised in that, sleeve (54,75) comprises two upstanding oppositely located walls (28,29) and a clamp plate (23,33) bridging the walls, the clamping plate (22,33) being connected to the walls (28,29) by means of bolts (31).

4. A cable guide system (1) according to claim 1, characterized in that, the coupling member (55) comprises a plate (56) transverse to the first cable guide conduit (13).

5. A cable system (1) according to claim 1, characterized in that, the coupling member comprises a plate (27) parallel to the first cable guide conduit (13).

6. A cable guide system (1) according to claim 1, characterised in that, the coupling elements (41,42) comprise a first part (43,44) having a screw thread and a gripping head (47,48) for being threaded into the machine part and comprising in the gripping head an internal screw thread for receiving a second coupling element part (45,46) having an external screw thread and a clamping head (49,50).

7. A cable guide system (1) according to claim 1, comprising a connector plate (16) for attaching to a wire receiving box (15), the connector plate carrying a connector (17) for receiving the first cable guide conduit (13) perpendicular to the connector plate (16).

8. A wire receiving box having a connector plate for use in a cable guide system according to claim 7, the wire receiving box having a connector plate carrying a connector (17) for receiving the first cable guide conduit (13) perpendicular to the connector plate (16).

9. The modular cable guide system of claim 1, further comprising a further cable guide conduit (14) having a number of regularly spaced connecting members (39, 40) distributed along its length for receiving coupling elements (19, 20, 41, 42) for connecting the second cable guide conduit (14) to the machine part.

10. A connector (17, 18, 53, 60, 72) for use in a cable guide system, comprising a sleeve (54, 75) for fitting around a first end of a first cable guide conduit (13), clamping means (22, 23, 30, 31, 33) for tightening the sleeve (54, 75) around the first cable guide conduit for forming a clamping connection with the first cable guide conduit, and a coupling member (27, 35, 36; 53, 75) for connecting the connector to a machine part (2) or to a second cable guide conduit (13');

wherein the connector (60) comprises a first segment (61) comprising the sleeve, a first plate (62) extending from the sleeve and comprising either two pins (63, 64) or two slots (67, 68) located on a circular track and a second segment (65) comprising a second plate (66) extending parallel to the first plate (62) of the first segment (61) and comprising the other of the two pins (63, 64) or the two slots (67, 68) and a coupling member or a sleeve for connecting the second segment (65) to a machine part (2) or to the second cable guide conduit (13'), the pins (63, 64) projecting through the slots (67, 68) such that the segments (61, 65) can be displaced with respect to one another, the pins (63, 64) further comprising locking means, for fixing the relative positions of the segments (61, 65).

* * * * *